June 28, 1927.

A. H. NARROW

SAW GAUGE

Filed Jan. 30, 1925

1,633,996

Inventor
Anton H. Narrow
By
Attorney

Patented June 28, 1927.

1,633,996

UNITED STATES PATENT OFFICE.

ANTON H. NARROW, OF MEMPHIS, TENNESSEE.

SAW GAUGE.

Application filed January 30, 1925. Serial No. 5,815.

My said invention relates to saw gauges and it is an object thereof to provide a device of the character herein described suitable for positioning with reference to the saw any kind of work having measure finding devices or means adapted to cooperate with the gauge. An instance of such a device is illustrated in my Patent No. 1,434,308, October 31, 1922, the disclosure being of a type bar or slug having an upward projection or measure finding dot extending above the level of the type on the slug, which projection is suited to cooperate with the straight edge of a gauge such as herein described.

A further object of the invention is to provide a gauge of this character which can be folded in small compass and entirely removed from the top of the table so as not to interfere with positioning and removal of the work.

Figure 1:
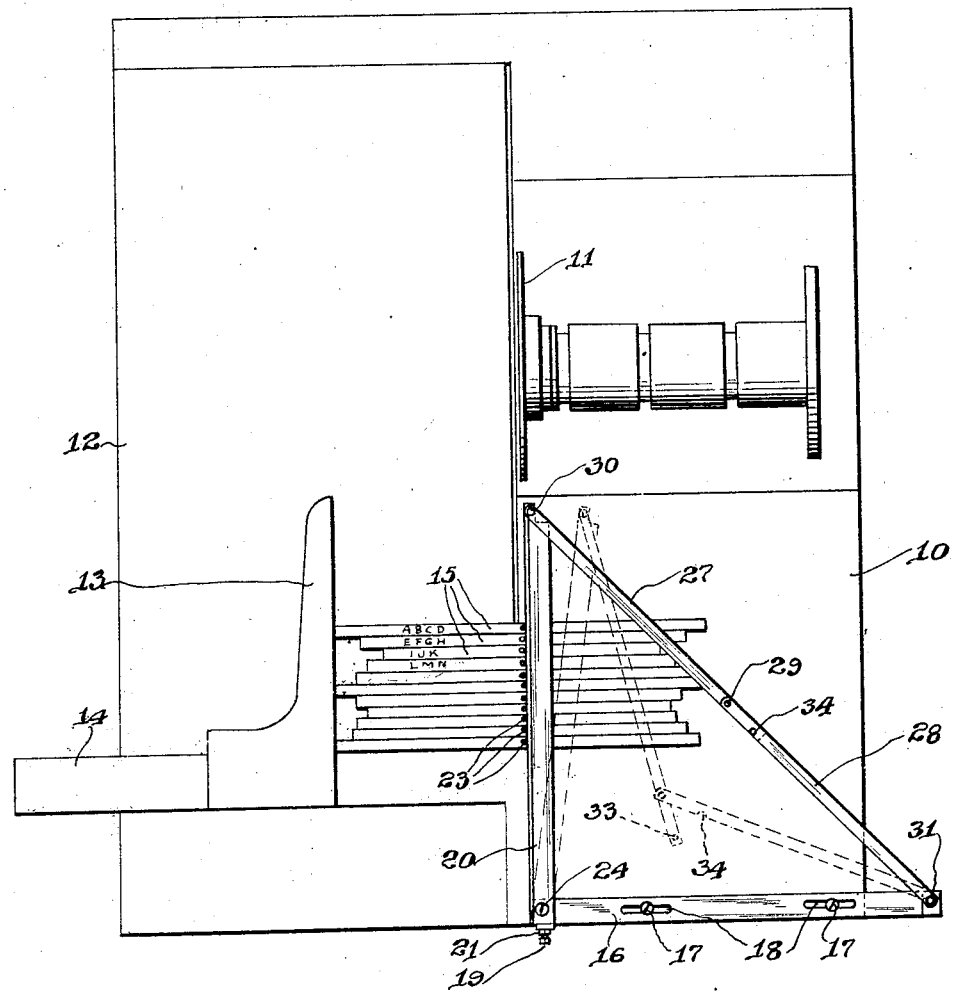
Figure 2:
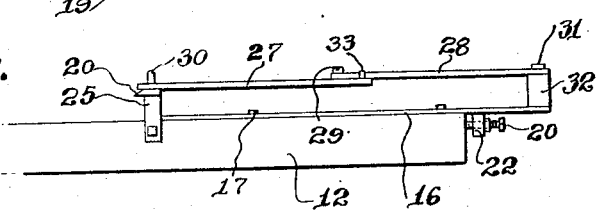
Figure 3:
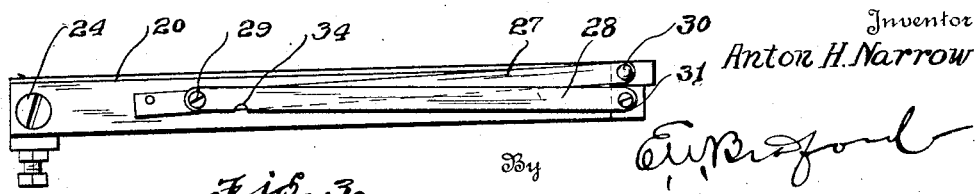

Referring to the accompanying drawings which are made a part hereof and on which similar reference characters indicate similar parts, Figure 1 is a plan of a saw with my invention applied thereto, Figure 2, a detail showing the device of my invention in elevation, and Figure 3, a similar detail in plan showing my device in partially folded position.

In the drawings reference character 10 indicates generally a sawing machine of known character bearing a circular saw 11 and a sliding work-table 12 by means of which the work is carried up to the saw. It is to be understood that my device may be applied to sawing machines of any description whether the table moves toward the saw or the saw moves toward the table and regardless of the character of the saw. The sliding table carries a stop 13 slidably mounted on a bar 14 having engagement with work indicated at 15 as consisting of type bars or slugs which are to be sawed off in customary manner to bring them to the proper length for setting up. Other instrumentalities customarily found on tables of this character are omitted from the drawing as not being essential to the disclosure of my invention.

The saw gauge comprising a bar 16 extending crosswise of the table and secured thereto by means of screws 17 passing through slots 18 in the bar and engaging threaded holes in the table. A set screw 19 is mounted in depending lugs secured to the bar 16 and the set screw serves for minor adjustments of the bar to bring the straight edge 20 into line with the saw. Lock nuts 21, 22 are placed on the set screw for securing them in adjusted position. The straight edge 20 is intended to contact with measure finding projections of any suitable or desirable character, these projections being shown here as comprising dots or lugs 23 extending upward from the type bars preferably to a height somewhat greater than that of the type, so that they may be pushed up against the straight edge and alined with the saw, after which the straight edge is preferably removed. It will be obvious that the straight edge is effective for engagement with measure finding devices other than upwardly extending projections of type bars and that it may be used for engaging directly with the type on such bars if desired, in which case the gauge must be moved so far to the left as to bring the straight edge into the path of the saw to prevent injury to the type due to bleeding or cutting the last letter in the line. When thus used the straight edge, of course, must be moved out of the way before the type can be cut or else the saw would run directly into the straight edge.

The bar 16 is connected to the straight edge 20 by a pivot 24 on a block 25 extending upward from the bar 16 and the opposite ends of the respective bars are connected by a toggle comprising a pair of links 27, 28 pivotally connected at 29 and pivoted to the bars 20 and 16 respectively at 30 and 31, the pivot 31 being on a block 32 extending upward from the bar 16. The parts may be folded together as indicated in dotted lines and when so folded the bar 20 will lie underneath the bar 27 and the bar 27 underneath the bar 28. The pivot 30, as indicated in Figure 2, extends upward to form a handle for straightening the links 27 and 28 to bring the straight edge to position, the movement of these links being limited by a pin 33 fitting in a notch 34 on the bar 28 (Fig. 3). The bar 20 is cut away at its further end so as to lie directly above the bar 16 when the device is completely folded, the cut-away portion providing a space to receive the block 32. Preferably the edge of the bar 20 adjacent the measure finding dots is beveled but this is not essential.

It will be obvious to those skilled in the art that various changes may be made in my device without departing from the spirit of the invention, and therefore I do not limit myself to what is shown in the drawings and described in the specification but only as indicated in the appended claims.

Having thus fully described my said invention, what I claim as new and desire to secure by Letters Patent, is:

1. A folding gauge comprising a supporting bar, spaced blocks on the supporting bar, a straight edge pivoted to one of said blocks for movement into and out of parallel relation to the supporting bar said straight edge having one end reduced to receive one of said blocks, and a toggle for locking the straight edge in position at right-angles to the supporting bar, substantially as set forth.

2. The combination of a work table, a gauge device associated with said work table and comprising an elongated support, a straight edge pivoted adjacent one end of said support and a pair of levers pivotally connected together and having their outer ends connected to said support and straight edge for normally maintaining them in fixed position relative to each other said levers being adapted to be moved relative to each other for moving the straight edge toward and from its normal position, substantially as set forth.

3. The combination of a work table, a gauge device associated with said work table and comprising an elongated support adjustable transversely of said work table, a straight edge pivotally mounted on said support adjacent one end and a pair of levers pivotally connected together and having their outer ends connected to said support and straight edge for normally maintaining them in fixed position relative to each other said levers being adapted to be moved relative to each other for moving the straight edge toward and from its normal position, substantially as set forth.

4. The combination with a work table of a supporting bar mounted on said work table, a straight edge pivoted on one end of said bar and a pair of levers pivoted together and having their outer ends pivoted one to said straight edge and the other to the end of the bar opposite that on which the straight edge is pivoted said levers being arranged to hold said straight edge in a given position relative to said supporting bar and adapted to be moved relative to each other for moving said straight edge from the said relative position, substantially as set forth.

5. The combination of a work table of an elongated support, a straight edge pivoted on one end of said support and a toggle lever having one end pivoted on said support and having its other end pivoted on said straight edge and normally holding the straight edge in position at an angle to said support and adapted to be broken for moving the straight edge from said angular position, substantially as set forth.

6. The combination of a saw, a table for supporting a plurality of type bars to be cut by said saw said type bars having measure finding devices thereon to be brought into alinement and a gauge supported on said table comprising an elongated support, a straight edge pivoted on said support and a toggle lever having its ends connected to said support and straight edge in spaced relation to their point of connection, said toggle lever being adapted to be operated for moving the straight edge to bring the measure finding devices into position to be cut by the saw and for retracting the same to prevent injuring the same during the sawing operation, substantially as set forth.

7. The combination with a slidable work table, of a supporting bar mounted on said work table a spacing block mounted on said bar adjacent each end, a straight edge pivoted on one of said blocks, a toggle lever pivoted on the other of said blocks and to the free end of said straight edge and normally holding said straight edge substantially perpendicular to said supporting bar but adapted to be broken for moving the free end of the straight edge toward and from said normal perpendicular position, substantially as set forth.

In witness whereof, I have hereunto set my hand at Memphis, Tennessee this twenty-seventh day of January, A. D. nineteen hundred and twenty-five.

ANTON H. NARROW.